United States Patent [19]

Khanna et al.

[11] 4,310,061
[45] Jan. 12, 1982

[54] STEERING GEOMETRY FOR ARTICULATED FARM TRACTOR

[75] Inventors: Jagdish C. Khanna, Downers Grove; William C. Kanas, Darien, both of Ill.

[73] Assignee: International Harvester Company, Chicago, Ill.

[21] Appl. No.: 114,178

[22] Filed: Jan. 22, 1980

[51] Int. Cl.³ .............................................. B62D 5/06
[52] U.S. Cl. .................................... 180/139; 180/134; 180/136
[58] Field of Search ................ 180/139, 137, 136, 134

[56] References Cited

U.S. PATENT DOCUMENTS

| | | | |
|---|---|---|---|
| 3,314,496 | 4/1967 | Thassy | 180/139 |
| 3,688,860 | 9/1972 | Molby | 180/139 |
| 3,773,129 | 11/1973 | Anderson | 180/139 |
| 4,081,054 | 3/1978 | Yates | 180/139 |
| 4,213,511 | 7/1980 | Rubenstein et al. | 180/139 |

*Primary Examiner*—Joseph F. Peters, Jr.
*Assistant Examiner*—Donn McGiehan
*Attorney, Agent, or Firm*—Douglas W. Rudy; F. David AuBuchon

[57] ABSTRACT

A farm tractor having front and rear frames pivotally interconnected to define an axis of articulation for steering in which the physical arrangement and relationships of the pivot points for the steering cylinders relative to said axis provide desired steering characteristics.

7 Claims, 4 Drawing Figures

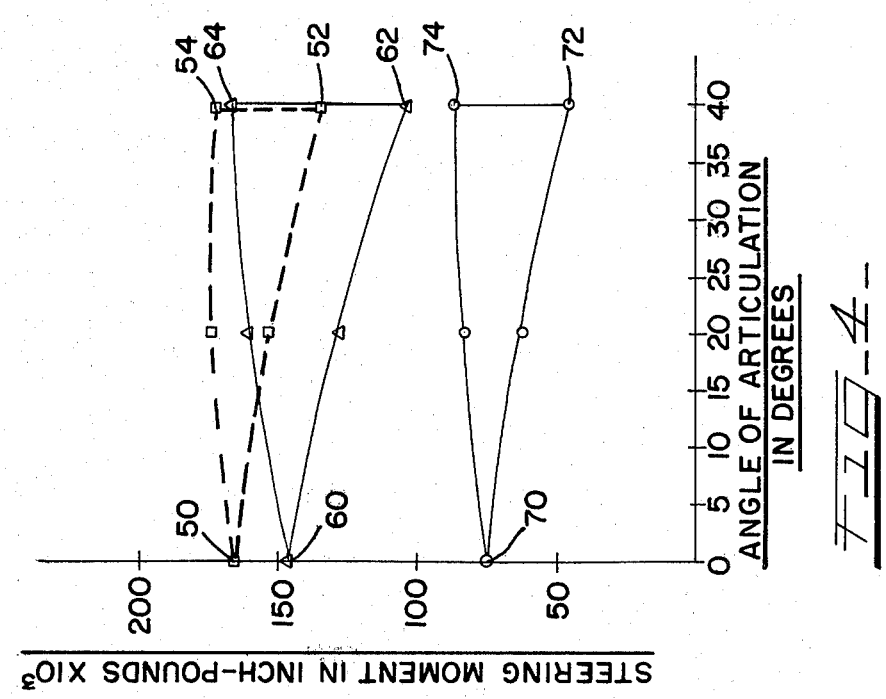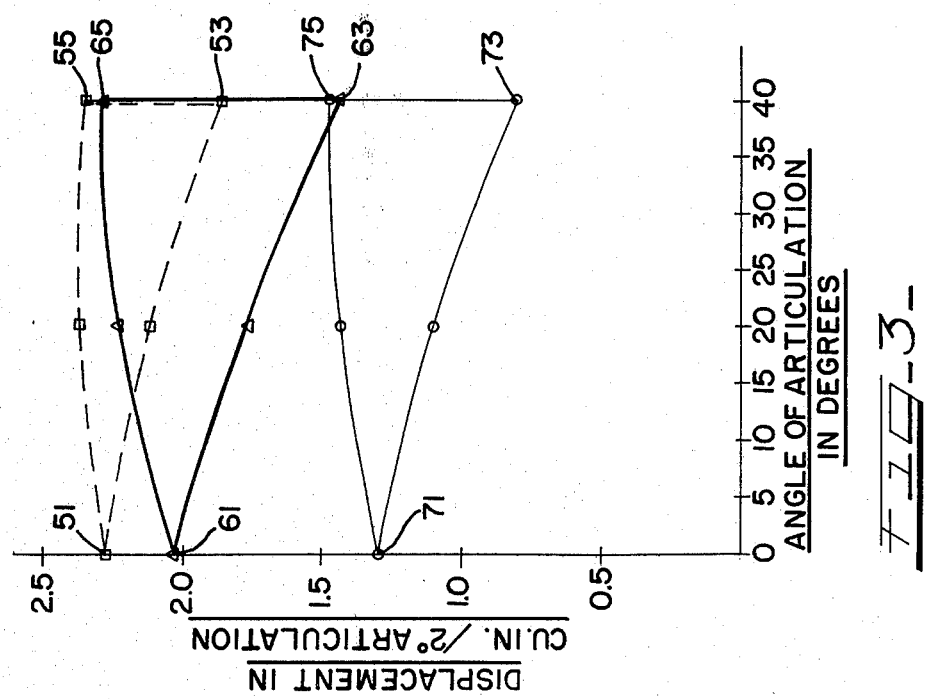

STEERING GEOMETRY FOR ARTICULATED FARM TRACTOR

BACKGROUND AND SUMMARY OF THE INVENTION

This invention relates to a steering arrangement for an articulated vehicle, and more particularly to the physical arrangement and relationships of the pivot points for the steering cylinders which provide those steering characteristics required of an agricultural or farm tractor for operation in row crops. Basically, it is important that such a steering arrangement provide a good steering moment or torque because the tractor itself is heavy, which weight is often increased by the transfer onto the tractor's axles of a portion of the weight of the implement mounted on or towed behind the tractor, and because the draft load tends to resist articulation, and because the conditions of the terrain being traversed is frequently muddy or otherwise not conducive to steering maneuvers, particularly extreme steering movements such as those necessary at the headlands which sometimes require a full 180° turn.

In addition to a good steering moment, a steering response which is uniform is highly desirable. It is apparent that use of an equal volume on each end of the individual steering cylinders, i.e. an equal area piston, would contribute to a uniform response. However, it is also apparent that the loss of available area on what would otherwise be the head end side of the piston would result in a reduction of the force contributing to the steering moment. Since the use of two cylinders, one on each side of the axis of articulation, will inherently require that one steering cylinder be extended while the other steering cylinder is contracted, the sum of the forces, i.e. pressure times the area on which it is acting, will be equal in either direction of turn. The problem is then not the force, but the variable moment arms upon which those two forces will act. The moment arm is a function of the geometry, specifically the location of the front and rear anchor points of the two cylinders with respect to the tractor articulation joint. Many factors affect this geometry, such as the space limitations and the availability of sound structural members capable of transmitting the steering torque between the front and rear frames.

The steering response is affected by the variable moment arm upon which each of the steering cylinders acts. In the turning mode, i.e. turning away from the straight ahead position, the response of the tractor improves whereas the available turning torque decreases. This is because the moment arm for the cylinder on the outside of the turn, which is expanding and thus has pressure acting on its larger head end area, is decreasing, while the cylinder on the inside of the turn, which is retracting and thus has pressure acting on its smaller rod end area, has a moment arm which is increasing. The result is a lower total turning moment towards the end of the turn. However, the response improves in this mode because for each degree of articulation the travel rate of the expanding cylinder is less than the travel rate of the retracting cylinder. Consequently, less total fluid is required for the same response toward the end of the turn as would be required at the straight ahead position.

In the returning mode, i.e. coming back from a fully articulated position to the straight ahead position, there is more available steering torque, but the response is slower. This is because the extended, but now retracting, cylinder has pressure acting on the smaller area side of its piston with a relatively short moment arm, while the retracted, but now expanding, cylinder has pressure acting on the larger area side of its piston with a relatively long moment arm. The resulting total steering torque is high but the steering response is slow because more total fluid is required to fill the cylinders for each degree of turn in restoring the tractor to its straight ahead position. With a hydrostatic steering system, in which the fluid going to the steering cylinders is metered through a hand pump connected to the steering wheel, this change in response from turning mode to returning mode is manifested in the operator being required to rotate the steering wheel more to return to straight ahead than was required to initially turn the tractor.

It is, therefore, an object of this invention to provide a steering arrangement for use with an articulated farm tractor having a hydrostatic steering system in which the difference in response between turning mode and returning mode is minimized, or at least substantially reduced.

It is also an object of this invention to provide a steering geometry for an articulated farm tractor which has good steering torque and a relatively uniform steering response.

It is a further object of this invention to provide such a steering geometry which is practical and which permits its use with a hydrostatic steering circuit having an operator controlled hand pump to meter fluid to the steering cylinders.

These and other objects of the present invention, and many of the attendant advantages thereof, will become more readily apparent upon a perusal of the following description and the accompanying drawings, wherein:

FIG. 3 is a graph of total fluid displacement as a function of angle of articulation; and FIG. 4 is a graph showing steering moment or torque as a function of angle of articulation.

DESCRIPTION OF A PREFERRED EMBODIMENT

Figure 1:
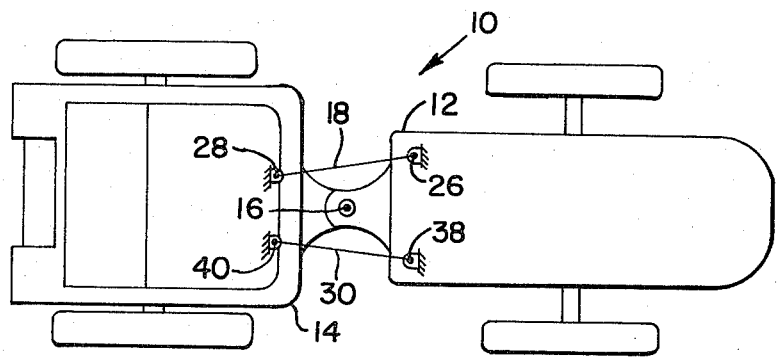
FIG. 1 is a top plan view of a tractor illustrating schematically the location of the steering cylinder according to the present invention.
Figure 2:
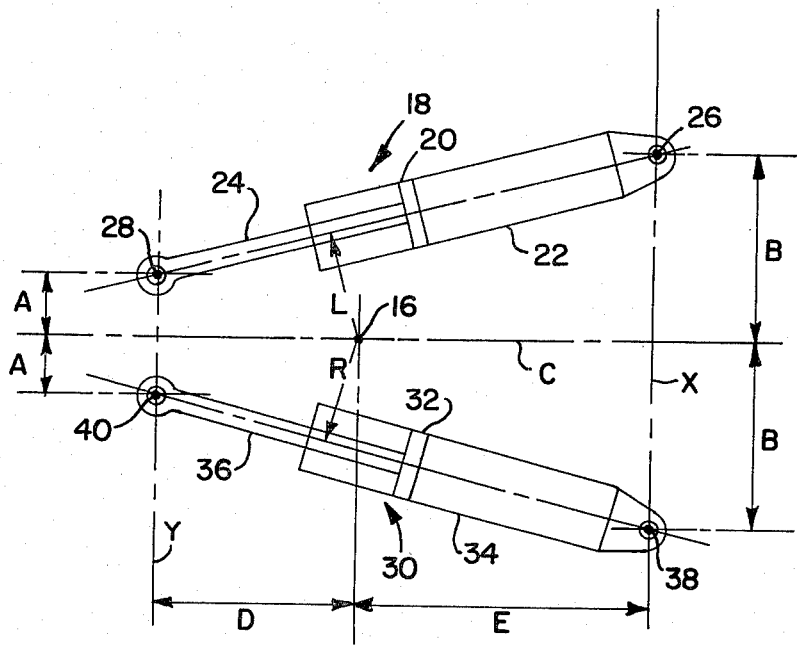
FIG. 2 is a detail of the steering geometry for the tractor shown in FIG. 1.

Referring more to FIG. 1 and 2, there is shown an articulated farm tractor, indicated generally at 10, having a front frame 12 and a rear frame 14 pivotally interconnected by conventional pin means to define an axis of articulation 16, located on the fore and aft or longitudinal centerline C of the tractor. A left side steering ram indicated generally at 18, includes a piston 20 reciprocable within a cylinder 22 with a piston rod 24 attached thereto. The cylinder 22 is pivotally connected to the front frame 12 by conventional pin means to define a pivot axis 26, and the rod 24 is similarly pinned to the rear frame 14 to define a pivot axis 28.

A right side steering ram, indicated generally at 30, includes a piston 32 reciprocable within a cylinder 34 with a rod 36 attached thereto. The cylinder 34 is pinned to the front frame 12 to define a pivot axis 38 and the rod 36 is pinned to the rear frame 14 to define a pivot axis 40.

The steering rams are arranged in a suitable hydraulic circuit, which may be of the type shown in U.S. Pat.

No. 4,213,511 issued July 22, 1980 or Application Ser. No. 114,431, filed the same day as this application by Erwin F. Link and William L. Schubert and entitled, Hydrostatic Steering Arrangement.

The pivot axis 28 and 40 are located a distance A on either side of the longitudinal centerline C, while the pivot axis 26 and 38 are located a distance B on either side of centerline C. Consequently, the distance between the axis 28 and 40 is 2A and the distance between the axis 26 and 38 is 2B. It has been discovered that the desired steering characteristics are approached when the distance B is 3 times distance A and the distance E is 1.5 times the distance D; E being the shortest distance from the axis 16 to the line X connecting the axis 26 and 38 and D being the shortest distance from the axis 16 the line Y connecting the axis 28 and 40.

Since the rods 24 and 36 must have sufficient strength to resist the compression loads to which they are subjected, it has been found practical to provide the rods with a diameter which is half the interior diameter of the cylinders 22 and 34, which would also be, for all practical purposes, the diameter of the pistons 20 and 32. The net result of these relationships provides optimum steering characteristics, which may be more fully appreciated by reference to FIGS. 3 and 4.

Referring first to steering moment curves of FIG. 4, the curve going from point 50 to point 52 shows the steering moment in inch-pounds (force) as the tractor is steered from its straight ahead position to a full 40 degrees of articulation, i.e. in its turning mode. The curve 54 to 50 shows the steering moment in the returning mode. In this case, the optimum geometry has been utilized; distance A is 6.00 inches, distance B is 18.00 inches, distance D is 10 inches, distance E is 15.00 inches, cylinder bore diameter is 3.00 inches and rod diameter is 1.50 inches. The system hydraulic pressure is 2550 psi. It will be seen in the turning mode, going from point 50 to point 52, that the steering moment as the tractor is steered from its straight ahead position, represented on the graph as 0 degrees of articulation. However, in the return mode, whatever the angle of articulation, the steering torque falls along the curve from point 54 to point 50. At full 40 degrees of articulation, the turning mode would produce slightly less than 150,000 in-lbs of steering moment as denoted by the point 52. However, the returning mode would produce over 170,000 in-lbs of steering moment, as denoted by the point 54.

The steering response for the same tractor, the physical dimensions for which were given in the paragraph above, is illustrated in FIG. 3 by the curves defined by the points 51 to 53 and the points 55 to 51. The turning mode, i.e. going from the straight ahead or 0 degrees position as denoted by point 51, requires progressively less hydraulic fluid for incremental steering movement as the angle of articulation increases. However, in the returning mode the combined displacement requirements for the steering cylinders is determined by the curve defined by points 55 to 51. It will be noted that the displacement is higher in the returning mode. However, the geometry related previously moves the two curves 51 to 53 and 55 to 51 close together so that the response is as nearly uniform as it is possible to achieve with simple, direct connections between the steering cylinders and the frames. Note also that the geometry has yielded, as shown in FIG. 4, a steering moment, which in all comparable positions, is high and relatively uniform between the turning and returning modes.

For comparison, a second set of curves is shown in FIGS. 3 and 4 wherein all dimensions and pressure are the same as given in connection with the optimum geometry described above, except that the rod diameter is increased from 1.50 inches to 2.00 inches. The steering moment curve, turning mode of FIG. 4 is defined by points 60 to 62 and returning mode by points 64 to 60, while displacement is shown in FIG. 3 as the curve defined by points 61 to 63 in turning mode and points 65 to 61 in returning mode. It will be noted that, while the displacement is lower for each angle of articulation in comparable modes, the discrepancy or difference between the two modes in this example are always greater than the optimum. It should also be noted that the steering moment in this example is always lower for comparable mode and angle of articulation than is the case with the optimum.

In the other example, the cylinder bore diameter is held at 3.00 inches and the rod diameter at 2.00 inches. The distance A is 4.48 inches, the distance B 14.90 inches, the distance D 6.14 inches and the distance E 20.47 inches. The system pressure is also reduced to 2000 psi. which would have an affect on the steering moment in FIG. 4 but no affect on displacement required in FIG. 3. The steering moment in turning mode is defined by the curve from point 70 to point 72 and returning mode by points 74 to 70. The steering response, as exemplified by the displacement in FIG. 3, is determined by the curve from point 71 to point 73 in turning mode and in returning mode by the points 75 to 71. Again the spread or difference between the lower curve 71 to 73 and upper curve 75 to 71 is at all angles of articulation greater than the optimum geometry.

Both the steering moment and the steering response and their uniformity are a function of the variable movement arm upon which each of the steering cylinders acts. In the turning mode, the response of the tractor improves whereas the steering moment decreases because of the moment arm variation. For example, in a right turn, the left ram 18 will be extended with pressure on the large area side of the piston 20, and the right ram 30 retracted, with pressure acting on the small area side of the piston 32. The moment arm for the left ram 18 is the perpendicular distance L from the axis of articulation 16 to the centerline of the ram 18. Similarly, for the right ram 30, the moment arm is the perpendicular distance R between the axis 16 and the centerline of ram 30. In a right turn, the distance L is decreasing and the distance R is increasing. Thus, the steering moment decreases with increasing angular articulation in a turning mode. The steering response is simultaneously improving in a right turn, turning mode because the travel rate of the expanding left ram 18 is less than the travel rate of the retracting right ram 30 for each successive degree of articulation. As a consequence, less total hydraulic fluid is required for the same response toward the end of the turn.

In the returning mode, from a position fully articulated to the right, the steering moment immediately increases because the extended, but now retracting left ram 18 has pressure acting on the rod side of its piston 20 with a relatively small moment arm L, while the retracted, but now expending right ram 30 has pressure acting on its piston's large area and with a relatively long moment arm R. The total steering moment is high, but the response is slower because more total fluid is required to fill the cylinders for each successive degree of articulation.

The geometrical relationships set forth herein provide optimum steering characteristics for an articulated farm tractor and achieve the objects recited. Various changes and modifications therein may occur to those skilled in the art without departing from the spirit of the invention as defined by the scope of the appended claims.

What is claimed is:

1. A steering arrangement for an articulated farm tractor capable of use in row crops having front and rear frames pivotally interconnected to define an axis of articulation comprising:
   a pair of steering rams positioned on either side of said axis and pivotally connected between said frames;
   each ram having a piston with a rod reciprocable within a cylinder; and
   the distance between the pivotal connection of said rams to said front frame being substantially three times the distance between the pivotal connection of said rams to said rear frame.

2. A steering arrangement according to claim 1 wherein:
   the distance between said axis of articulation and said front frame connections is substantially one and a half times the distance between said axis of articulation and said rear frame connections.

3. A steering arrangement according to claims 1 or 2 wherein:
   the diameter of said piston is twice the diameter of said rod.

4. A steering arrangement for an articulated farm tractor capable of use in row cros having a hydrostatic steering circuit with front and rear frames articulated about an axis, comprising:
   a pair of steering rams positioned on either side of said axis and pivotally connected between said frames;
   each ram having a piston and rod reciprocable in a cylinder; and
   the distance between the pivotal connection of said rams to said front frame being substantially three times the distance between the pivotal connection of said rams to said rear frame.

5. A steering arrangement according to claim 4 wherein:
   the distance between said axis of articulation and said front frame connections is substantially 50% greater than the distance between said axis of articulation and said rear frame connections.

6. A steering arrangement according to claims 4 or 5, wherein:
   the diameter of said rod is substantially one-half the diameter of said cylinders.

7. A steering arrangement for an articulated farm tractor capable of use in row crops having front and rear frames pivotally interconnected to define an axis of articulation, comprising:
   a pair of steering rams positioned on either side of said axis;
   each ram having a piston reciprocable within a cylinder with a rod attached to the piston;
   said cylinder having a diameter twice the diameter of said rod;
   a first pair of pins pivotally connecting said cylinders to said front frame;
   a second pair of pins pivotally connecting said rods to said rear frame;
   the distance between said first pair of pins being three times the distance between said second pair of pins;
   the distance between said axis and the line defined by said first pair of pins being one and a half times the distance between said axis and the line defined by said second pair of pins; and
   said pins and said pair of steering rams being arranged symetrically about the longitudinal centerline of the tractor.

* * * * *